United States Patent
Yung

[19]

[11] Patent Number: 6,119,669

[45] Date of Patent: Sep. 19, 2000

[54] ANGULAR POSITION PREDICTION FOR ENGINE IGNITION CONTROL

[75] Inventor: Siu Ming Yung, Fotan, The Hong Kong Special Administrative Region of the People's Republic of China

[73] Assignee: Cosmo Solution Limited, Hong Kong, The Hong Kong Special Administrative Region of the People's Republic of China

[21] Appl. No.: 09/035,610

[22] Filed: Mar. 4, 1998

[51] Int. Cl.[7] .................................................. F02P 5/00
[52] U.S. Cl. ...................................... 123/643; 123/406.12
[58] Field of Search ..................... 123/406.12, 406.56, 123/406.57, 406.58, 406.59, 406.65, 599, 335, 463; 701/102

[56] References Cited

U.S. PATENT DOCUMENTS

| | | | |
|---|---|---|---|
| 3,921,606 | 11/1975 | Habert | 123/148 |
| 4,038,951 | 8/1977 | Schwelkart | 123/148 |
| 4,229,793 | 10/1980 | Yoshida et al. | 123/486 |
| 4,237,835 | 12/1980 | Rabus et al. | 123/418 |
| 4,901,704 | 2/1990 | Safranek | 123/599 |
| 5,041,979 | 8/1991 | Hirka et al. | 364/431.04 |
| 5,284,116 | 2/1994 | Richeson, Jr. | 123/425 |
| 5,517,962 | 5/1996 | Ling | 123/335 |

*Primary Examiner*—Henry C. Yuen
*Assistant Examiner*—Mahmoud M Gimie

[57] ABSTRACT

An engine ignition control system includes a device adapted to receive the ignition timing signal which is generated by the engine original ignition pulse generator. The device derives a pulse sequence synchronous with the rotation of the engine from the original ignition timing signal. The device then generates a precision ignition signal from the synchronous sequence pulse at the optimum ignition angle. The precision ignition signal is supplied back to the original ignition system of the engine for the generation of the ignition sparks. The synchronous pulse sequence represents the angular position of the rotation of the engine in higher accuracy then the original ignition timing signal. In preferred embodiments, the synchronous pulse sequence represents the angular position of the engine up to 1 degree making high accuracy ignition advance control for most old engines that can produce only the ignition timing signal from its original ignition pulse generator possible.

8 Claims, 5 Drawing Sheets

ANGULAR POSITION PREDICTION FOR ENGINE IGNITION CONTROL

FIELD OF THE INVENTION

The present invention relates to an engine ignition control system and more specifically to an engine ignition control system which predicts the engine angular position for optimum ignition basing on the original ignition timing signal.

BACKGROUND OF THE INVENTION

A spark-ignition internal combustion engine is powered by the ignition of combustion mixture which develops pressure to pistons driving the crank shaft. The power delivered to the piston will be maximum if it is driven at the time when the piston is positioned at the top dead center. Ignition of fuel in the combustion chamber occurs when a spark is generated across the spark plug at a specific time controlled by the ignition system. Since the pressure of the combustion need some times to develop after the ignition. To maximize the power, the ignition should occur before the piston reaching the top dead center.

The ignition control system is responsible for the generation of ignition; the determination of the exact timing for the ignition and the management required for the related devices such that they can work efficiently.

There are two common ignition generation methods.

The first type of the ignition generation system is the contact-breaker system in which timing pulses are generated by a contact-breaker mechanically coupled to the crank shaft of the engine, normally the contact is closed to allow current to flow through the ignition coil. Reaching the right time for ignition, the contact is broken, magnetic field in the coil collapses suddenly, a high voltage needed for the ignition is induced in the secondary winding of the ignition coil. Some systems employ beaker-less electronic devices to substitute for the contacts which may wear out, these electronic devices include magnetic induction; hall effect; optical pickup devices which practically have no wear out. The problem of this type of ignition system being extra measures has to be taken to handle the dwell angle since current has to remain flowing through the ignition coil in order to maintain the magnetic field. Dwell angle control is employed to determine the optimum time when to switch on the current before the next ignition otherwise the power dissipation of the ignition coil is accountable.

The second type of the ignition generation system is the capacitor discharge system in which the spark for ignition are generated by the rapid discharge of a charged capacitor through the ignition coil. The advantage of such system being, no power dissipation after the capacitor is fully charged because the charging current ceases, and the energy stored in a capacitor is the energy for sparking. It remains relatively constant until it reaches the high engine speed, at which the charging time for the capacitor is not enough.

Such ignition systems described above offer only the high energy sparks for ignition, the time at which such sparks should occur has to be precisely controlled in order to achieve high engine efficiency. Assuming that the time required for the pressure of the ignited mixture to develop is constant, the higher the engine speed, the position of the piston should be further away before reaching the top dead center. This position is normally interpreted as angular position and is commonly called the ignition advance angle or simply ignition advance.

Actually, many factors affect the time required for the combustion to deliver its maximum power, and the ignition advance should change according to the rotational speed of the engine, normally the ignition advance increases with a steeper slope at the lower speed and gradually become less steep at the higher speed.

Motor cars are spacious enough to handle such advance mechanically, they have the centrifugal ignition advance control to compensate for speed changes and the vacuum ignition advance control to compensate for air fuel ratio. However, those devices are either not accuracy enough or they cannot respond to rapid changes at which states the fuel wastage are obvious.

Most of the motorcycle ignition advance are fixed values, for example 18 degrees before top dead center BTDC at idle speed and remains unchanged though out the operating range. This simple fact indicates that most of the motorcycle are not working in the optimum performance.

Ignition advance control is to compensate the time required for the ignition of fuel to reach its maximum pressure; dwell angle is to control the time before supplying current to the ignition coil so that the power dissipation in the coil is minimized. Both are functions of time. In the traditional engines, time T can only be represented by an angle D (degree) while the engine is running at the rotational speed R.P.M.(revolution per minute)

$$D=[T \times R.P.M. \times 360/60]$$

for example if the time required for the combustion pressure to develop is 4 milliseconds, then at 1000 R.P.M., by advancing the ignition by 4 milliseconds means the ignition should occur while the crank shaft is positioned at 24 degrees before reaching the top dead center. Ignition advance angle and dwell angle should be defined together with the R.P.M. the engine is running at. These values are commonly represented by curves with ignition advance angle and dwell angle vs. The engine rotational speed.

If there exist a set of optimum ignition advance angles for various operation conditions represented as curves, then if the ignition system is triggered at the angle as indicated in the curves, the ignition of the engine are said to be optimized. Practically curves for various operation conditions such as temperature, humidity, octane value, etc. can be obtained from tables stored in read only memory device, or they can be determined by computing devices which connect directly to sensors tracing the related physical quantities. An angular position reference precise enough to indicate the angle for the ignition is needed.

For every ignition coil, there exist a best charging time for the magnet field at different supply voltage. If these values are transformed to angle C at different engine rotational speeds, thus by storing $P=90°-C$ (4 cylinders) or $P=60°-C$ (6 cylinders) in the read only memory device, by converting the analog values of the supply voltage to digital values, then by looking up tables that contain the values for the angle P for different supply voltages and engine rotational speeds, Dwell angle can be controlled if a precise enough angular position reference is available.

Improving the efficiency of engines is the modern trend, it helps to preserve energy and to protect the environment. Other than changing the compression ratio; adding valves etc. mechanically, modern engine design uses two major approaches to achieve engine improvement.

Firstly, high precision ignition control is employed. The modern ignition control system requires that the accuracy of such reference to within 1 degree. The control unit can that compute or lookup tables to determine the optimum ignition angle.

Secondly, high precision fuel control is employed. The best fuel to air ratio; injection, etc., are controlled by the computer according to the operating conditions.

Both measures required entirely new devices. Commonly, the ignition timing signal is not coming from the distributor but a new crank shaft position detector; the fuel is not supplying from the carburetor but the fuel injection devices. These new measures are not for traditional engine which can only be working inefficiently, polluting the environment until they extinct.

An object of the invention is therefore to provide an angular position prediction device which derives a pulse sequence synchronous with the rotation of the engine from the original ignition timing signal such that optimum ignition for any engine is possible.

SUMMARY OF THE INVENTION

The invention provides an ignition control system for internal combustion engine including an ignition control device adapted to receive the ignition timing signal which is generated by the engine original ignition pulse generator, wherein the engine rotation angular position predictor in the said device derives a pulse sequence synchronous with the rotation of the said engine from the said original ignition timing signal, the said device then generates a precision ignition signal from the said synchronous sequence pulse at the optimum ignition angle, the said ignition signal is supplied back to the said original ignition system of the said engine for the generation of the ignition sparks, and the said optimum ignition angle may either be stored in memory devices or be determined by computing device which connects to sensors which traces the related physical quantities.

The said engine rotation angular position predictor is a computation system which calculates and predicts the angular position of the said engine basing on the said original ignition timing signal containing instantaneous engine position, angular speed and acceleration information. The said computation system may includes analog or digital system which employs computing algorithms that can calculate, predict and perform error correcting such that a high precision synchronous pulse sequence representing the angular position of the rotation of the said engine can be generated.

The said synchronous pulse sequence is a sequence that each pulse represents the said engine rotation angular position predictor resolution M, if the said engine rotation angular position predictor resolution is 2 degrees, thus each said pulse corresponds to the rotation of the said engine by 2 degrees. By Counting the number of said pulse elapsed from a reference point of know angular position, the angle position of the engine can be determined. The said reference point of know angular position may be the original ignition pulse which occur at the original known angle, however any other suitable means of obtaining reference point of know angular position may be used.

The ignition control system may be suitable for adapting existing ignition system electronic ignition or conventional ignition. The ignition control system is placed between the original ignition pulse generator and the ignition system, such timing pulse generator includes contact-breaker, magnetic induction pickup, hall effect, optical pickup. Such ignition system includes capacitor discharge ignition system, contact breaker system and engine management system.

The ignition control system may have multiple ignition advance curves stored as tables in the device, these curves may include economical curve that ignition advance are set for most economical combustion; curve for high engine speed in which ignition advance are set for faster pick up and efficiency at high speed; high pay load curve in which ignition advance are optimized for high power. In some embodiments, more curves can be stored; curve value can be tailor-made to individual engine.

The ignition control system may have manual or automatic curves selection. In some embodiments, curves can be selected anytime by manual switches or automatically by the device computation algorithm.

The ignition control system may have a computing device which can determine the optimum ignition angle directly from the data obtained by the sensors tracing the related physical quantities.

The ignition control system may have a switch to provide angular offset to the produced precision ignition signal such that it is shifted in advance or retard from the original ignition timing signal to compensate the mechanical error in the idle ignition advance setting which otherwise can only be adjusted mechanically.

The ignition control system may have a maximum engine speed setting which limits the engine from running at the speed higher that the setting.

The ignition control system may have a handset which transmits a device identification code. On comparison of the code with the stored value, the generated precision ignition signal can be disabled if the codes do not match.

The ignition control system may be installed in a detachable unit, by removing the unit from the housing, the ignition may either be disabled or switched back to its uncontrolled operation.

The operation of the ignition control system may be overridden by an external interface which may include parallel, serial or wireless links to control the operation of the device such as monitoring the engine speed, curve selected and the engine instantaneous advance, overriding the advance directly or changing the curve contents.

The said external interface may be connected to an external control unit or a computer system which provides the management function.

BRIEF DESCRIPTION OF THE DRAWINGS

Embodiments of the invention will now be described by way of example only and with reference to the accompanying drawings, in which.

DETAILED DESCRIPTION OF THE PREFERRED EMBODIMENTS

Figure 1:
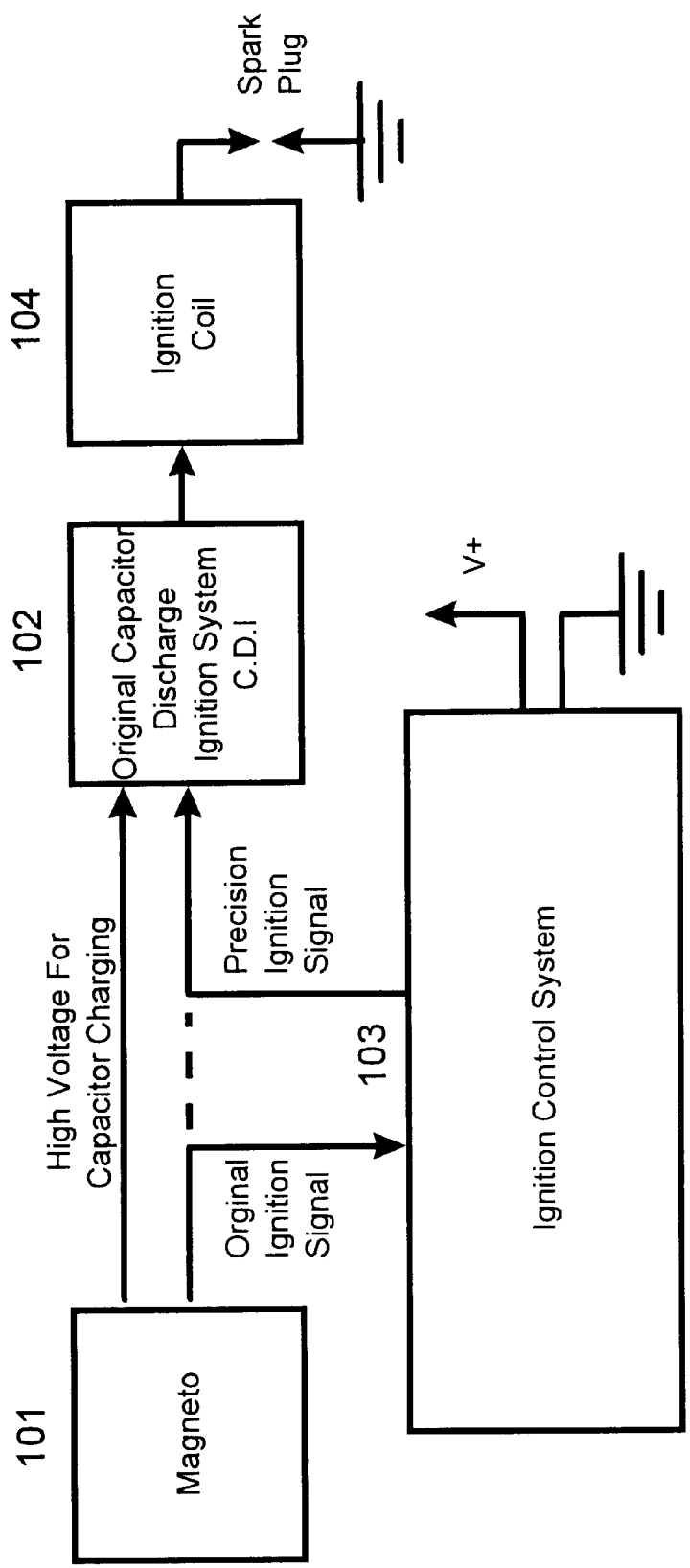
FIG. 1 shows a block diagram of the connection of the ignition control system and the motorcycle employing the present invention.

FIG. 1 shows the first embodiment, a block diagram of the connection of the ignition control system and the motorcycle employing the present invention. The original ignition pulse which is generated by a magneto 101 coupling directly to the crank shaft of the engine is connected to the ignition control device 103, the produced precision ignition signal is fed to the original capacitor discharge ignition system 102 which drives the ignition coil 104 to generate the sparks.

The original ignition pulse is generated by a magneto 101, however it may be generated by any device which generates pulse whose position and frequency are fixed in relation to the position and speed of the rotation of the engine.

The original capacitor discharge ignition system 102 generated the high-voltage for ignition after receiving the precision ignition pulse, however any suitable device that can generate the high-voltage for ignition after receiving the precision ignition pulse may be used.

Figure 2:
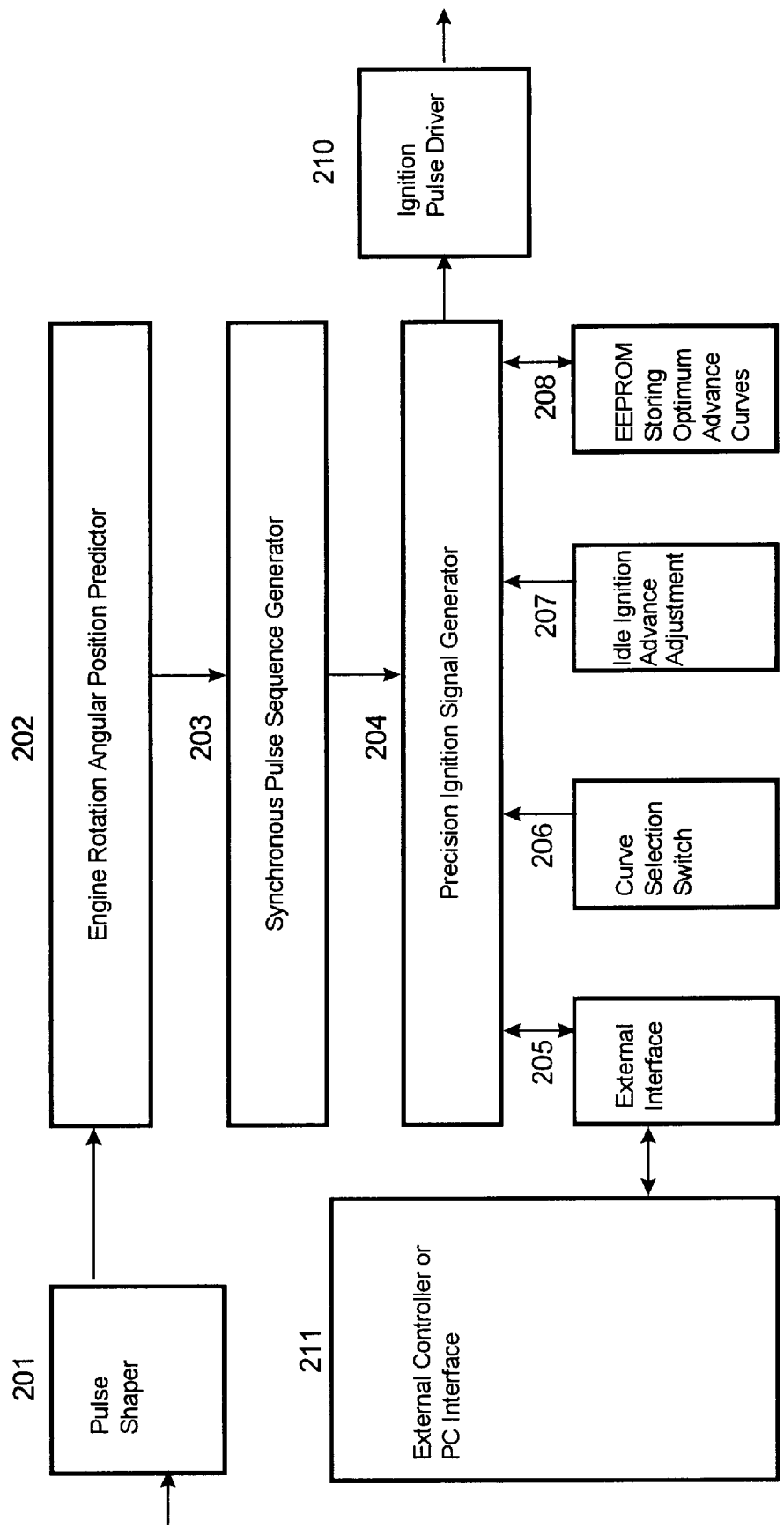
FIG. 2 shows a block diagram of the related function of the motorcycle employing the present invention.

FIG. 2 shows a block diagram of the motorcycle after employing the present invention.

The original ignition timing signal which is generated by the magneto is conditioned by the pulse shaper 201, it is then used by the engine rotation angular position predictor 202 to derive a synchronous pulse sequence 203 which represents the angular position of the rotation of the engine.

In this embodiment, the reference point of know angular position is the original ignition pulse which occurs at every half cycle 180° of the engine rotation. However the absolute TDC position has to be offset since the pulse is fixed at a certain angle F before top dead center BTDC. Therefore the TDC can be determined by F/M number of synchronous pulses elapsed before reaching the reference point of know angular position where M is the resolution of the angular position predictor and F is the angle offset of the reference point of know angle position from the TDC.

Consequently, if the optimum ignition angle is N degrees BTDC, then the number of synchronous pulses before reaching the reference position of know angular position can be determined by (N−F)/M. where M is the resolution of the angular position predictor, F is the angle offset of the reference point of know angular position from the BTDC and N is the optimum ignition angle.

The idle ignition advance adjustment switch 207 provides a means to calibrate the idle advance without actually adjusting it mechanically. This setting can also be used to compensate for different octane value; change of spark plus type, etc. By converting the value of the adjustment switch to number of synchronous pulse W, then by advancing or retarding the precision ignition pulse by W pulses effectively adjusts the angle according to the switch setting.

Figure 5:
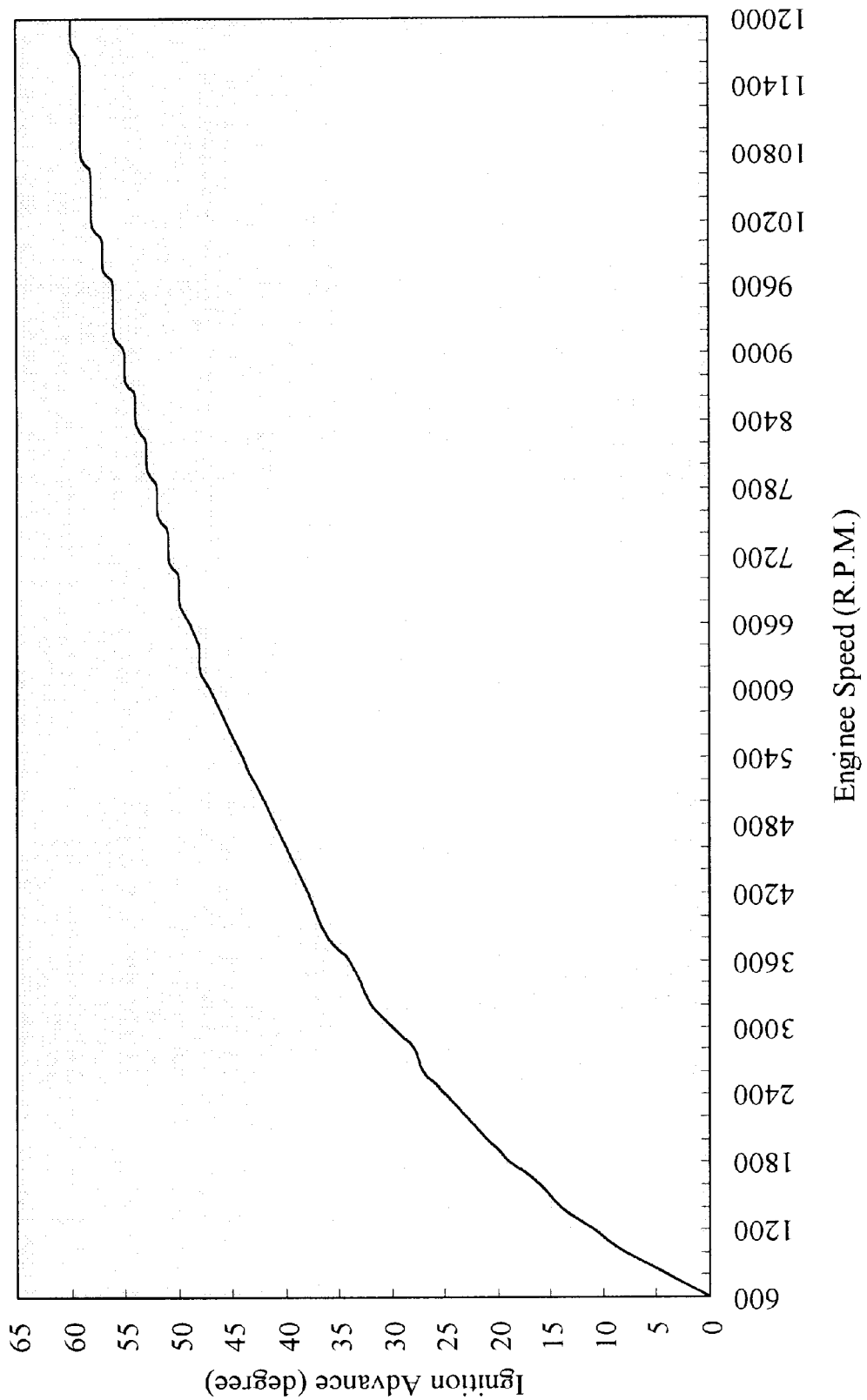
FIG. 5 shows a typical ignition advance vs. Engine rotational speed curves for a 4 strokes motorcycle.

FIG. 5 shows the optimum ignition advance curve for a typical 4 strokes motorcycle engine.

The curves for different operation conditions are stored in the EEPROM 208. Three curves are stored in this embodiment, the economical curve provides the most energy saving and less polluted ignition advance timing; the high speed curve provides best pick up and high engine speed ignition advance timing; the high payload curve provides ignition advance timing for high fuel to air ratio combustion. These curves can be selected by the curve selection switch setting 206 anytime even while the engine is running.

The external interface 205 provides a mean to monitor the performance of the engine, to control the system via the external device attached and to set the curve data stored in the memory. The external device 211 connected to the external interface 205 may be computer running software for the monitoring, controlling and setting of the curves, or it may be any external device providing these functions partially or completely.

The maximum speed limit can be set by an external device 211 to protect the engine from running out of its safety working range. The device identification code can also be set by the external device 211 to enforce the security. Once the speed limit is set, the precision ignition pulse generator 204 will cease to operate if the engine speed reaches the limit or the precision ignition signal generator 204 will generates the ignition pulse according to all settings. The generated precision ignition pulse is then fed to the ignition pulse driver 210 to trigger the original capacitor discharge ignition system that produce the sparks.

Figure 3:
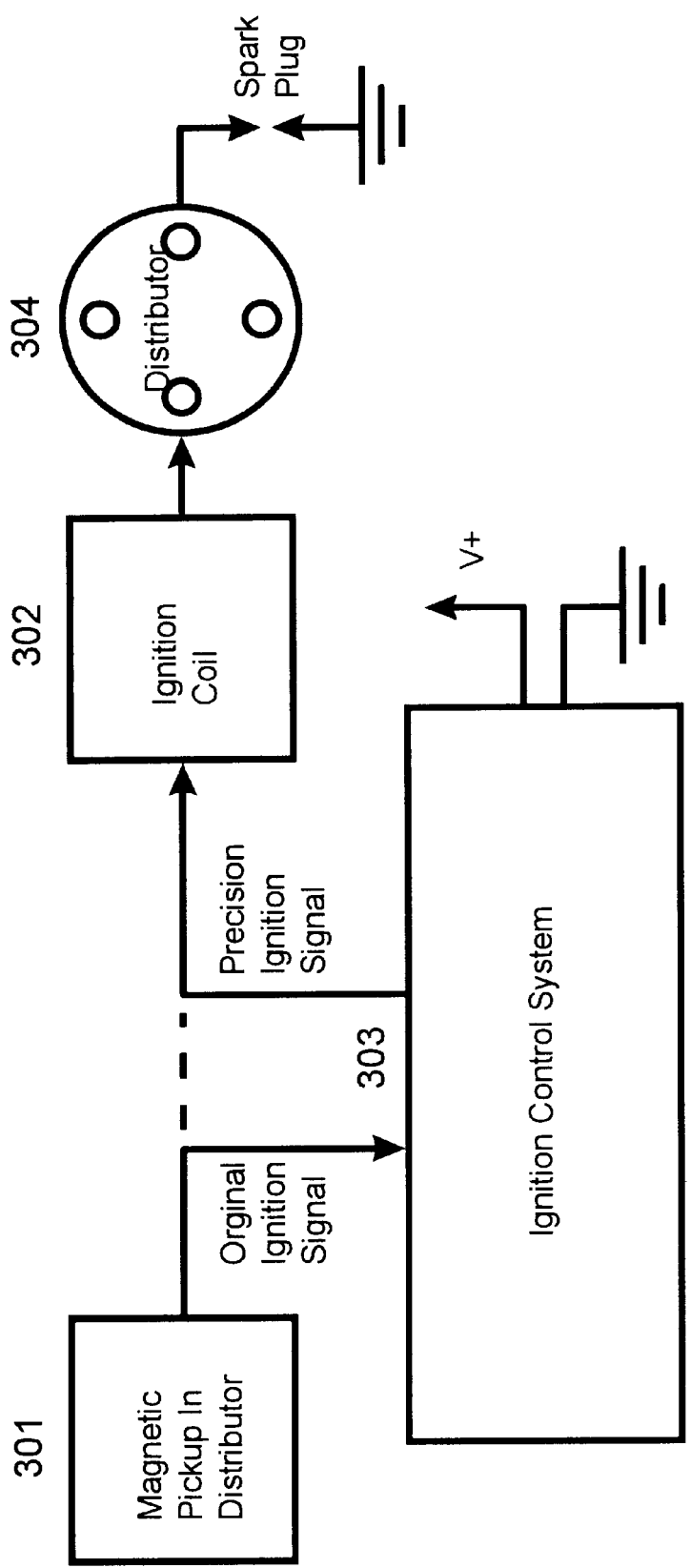
FIG. 3 shows a block diagram of the connection of the ignition control system and the motorcar employing the present invention.

A block diagram show a motorcar employing the present invention according to a second embodiment is shown in FIG. 3. As in the first embodiment, the original ignition timing signal which is generated by the magnetic pickup device in the distributor 301 is connected to the ignition control device 303, the produced precision ignition signal is fed to the ignition coil 302 of original electronic ignition system, the generated high voltage is distributed in turn to sparks plugs through the distributor 304 to generate the sparks.

Figure 4:
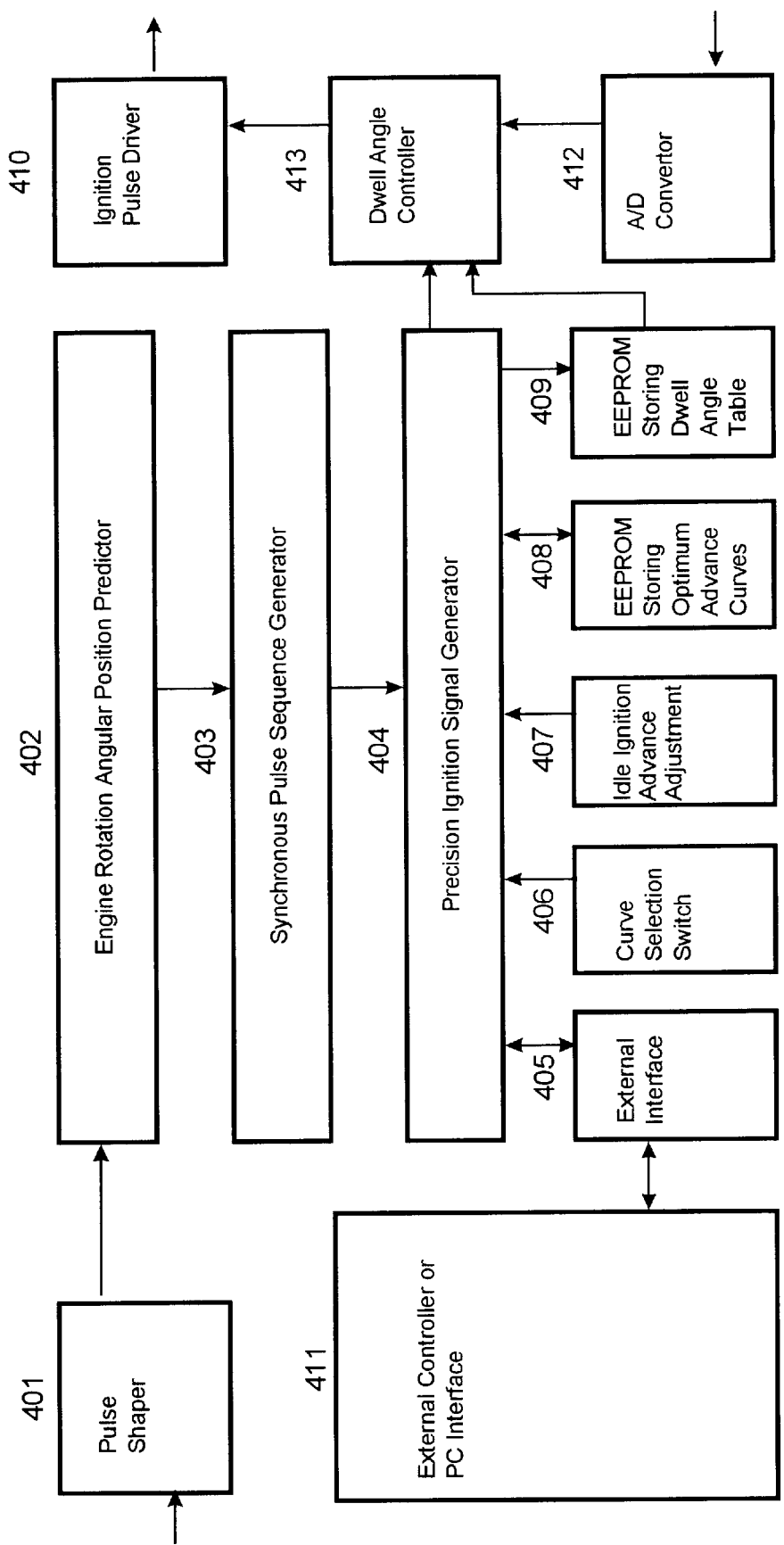
FIG. 4 shows a block diagram of the related function of the motorcar employing the present invention.

FIG. 4 shows the functions of the motorcar after employing the present invention. All functions as in the first embodiment are provided, together with the following features.

As in the first embodiment, the original ignition timing signal from the pulse generator in the distributor is conditioned by the pulse shaper 401, it is used by the engine rotation angular position predictor 402 to derive a synchronous pulse sequence 403 which represents the angular position of the rotation of the engine.

The dwell angle controller 413 provides the control by looking up table in the EEPROM 409. The supply voltage value is measured by the Analog to Digital converter 412, the digital voltage value and the engine speed is used to address the equivalent dwell angle P in the table stored in the EEPROM 409. Current is allowed to flow through the ignition coil P degrees after each ignition, using the synchronous pulse sequence as the angular position reference. By providing the dwell angle control, the ignition coil works more efficiently through out the operating range.

The original centrifugal advance device are disabled to allow the device to provide ignition advance electronically. If the vacuum advance gain is accurate then only the economical curve is used as the fundamental, otherwise, the vacuum advance is disabled, more curves are stored for better control and the curve selection is done by computing algorithm.

Other embodiments and variations within the spirit and scope of the invention are anticipated.

What is claimed is:

1. An engine ignition control system for internal combustion engines comprising an ignition control device arranged to receive an original ignition timing signal, an engine rotation angular position predictor in said ignition control device generates a pulse sequence synchronous with the rotation of the engine, said ignition control device further arranged to generate an ignition pulse for the generation of the sparks from said synchronous pulse sequence at an optimum ignition angle.

2. The engine ignition control system of claim 1 wherein said engine rotation angular position predictor derives said synchronous pulse sequence from said original ignition timing signal by a prediction algorithm, said to predict an instantaneous angular position of said engine.

3. The engine ignition control system of claim 2 wherein said original ignition timing signal and the synchronous pulse sequence generated in one cycle of said engine are in the ratio of R:S where R and S are different integers, S being the multiple of R.

4. The engine ignition control system of claim 3 wherein said optimum ignition angle is stored in memory device.

5. The engine ignition control system of claim 3 wherein said optimum ignition angle is determined by a computing device.

6. The engine ignition control system of claim 3 wherein said optimum ignition angle is provided by an external device through an external interface.

7. The engine ignition control system of claim 3 further comprising a function to set and validate a device identification code.

8. The engine ignition control system of claim 3 further comprising a function to set a maximum speed limit for the said engine.

* * * * *